(12) United States Patent
Sugabrahmam et al.

(10) Patent No.: US 9,417,976 B2
(45) Date of Patent: Aug. 16, 2016

(54) PREVENTING MIGRATION OF A VIRTUAL MACHINE FROM AFFECTING DISASTER RECOVERY OF REPLICA

(71) Applicant: VMware, Inc., Palo Alto, CA (US)

(72) Inventors: Giridharan Sugabrahmam, Santa Clara, CA (US); Ilia Langouev, Santa Cruz, CA (US); Aleksey Pershin, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 145 days.

(21) Appl. No.: 14/473,744

(22) Filed: Aug. 29, 2014

(65) Prior Publication Data

US 2016/0062853 A1 Mar. 3, 2016

(51) Int. Cl.
*G06F 11/00* (2006.01)
*G06F 11/20* (2006.01)
*G06F 9/455* (2006.01)

(52) U.S. Cl.
CPC .......... *G06F 11/203* (2013.01); *G06F 9/45558* (2013.01); *G06F 2009/45575* (2013.01); *G06F 2009/45591* (2013.01); *G06F 2201/815* (2013.01)

(58) Field of Classification Search
None
See application file for complete search history.

(56) References Cited

U.S. PATENT DOCUMENTS

| 7,143,307 | B1 * | 11/2006 | Witte .................. G06F 11/1435 714/6.23 |
| 7,900,005 | B2 * | 3/2011 | Kotsovinos .......... G06F 9/5083 711/162 |
| 2003/0046602 | A1 * | 3/2003 | Hino .................... G06F 11/2033 714/4.4 |
| 2003/0188114 | A1 | 10/2003 | Lubbers et al. |
| 2004/0158588 | A1 * | 8/2004 | Pruet, III ........... G06F 17/30578 |
| 2004/0267829 | A1 * | 12/2004 | Hirakawa ............ G06F 11/2064 |
| 2006/0047660 | A1 * | 3/2006 | Ikegaya ................ G06F 3/0605 |
| 2007/0208760 | A1 | 9/2007 | Reuter et al. |
| 2007/0233981 | A1 * | 10/2007 | Arakawa ............. G06F 11/2064 711/162 |
| 2007/0233987 | A1 | 10/2007 | Maruyama et al. |
| 2008/0126842 | A1 | 5/2008 | Jacobson et al. |
| 2010/0049917 | A1 * | 2/2010 | Kono .................... G06F 3/0605 711/114 |
| 2010/0114634 | A1 | 5/2010 | Christiansen et al. |
| 2010/0257140 | A1 | 10/2010 | Davis et al. |
| 2011/0022879 | A1 | 1/2011 | Chavda et al. |
| 2011/0314239 | A1 | 12/2011 | Kono et al. |
| 2013/0007741 | A1 | 1/2013 | Britsch et al. |
| 2014/0033201 | A1 * | 1/2014 | Dawkins ............. G06F 11/1484 718/1 |
| 2015/0324260 | A1 * | 11/2015 | Mutalik ................ G06F 11/203 714/703 |
| 2015/0378832 | A1 * | 12/2015 | Brown ................ G06F 11/1451 714/19 |

OTHER PUBLICATIONS

Du et al., "Paratus: Instantaneous Failover via Virtual Machine Replication", 2009, IEEE, Eighth International Conference on Grid and Cooperative Computing.*
Medina et al., "A Survey of Migration Mechanisms of Virtual Machines", Jan. 2014, ACM, Comput. Surv. 46, 3, Article 30.*
Office Action dated Apr. 7, 2016 in related U.S. Appl. No. 14/473,664.

* cited by examiner

*Primary Examiner* — Gabriel Chu
(74) *Attorney, Agent, or Firm* — Patterson & Sheridan LLP

(57) ABSTRACT

A storage migration engine and a recovery manager are provided that enable failover operations to be performed in situations where storage migration and array-based replication are involved. The storage migration engine stores information related to storage migrations directly into a source datastore and a destination datastore, which are then replicated over to a recovery site. The recovery manager uses the information stored in the recovered datastores to select which instance of virtual machine data is to be used to fail over to a virtual machine at the recovery site.

20 Claims, 9 Drawing Sheets

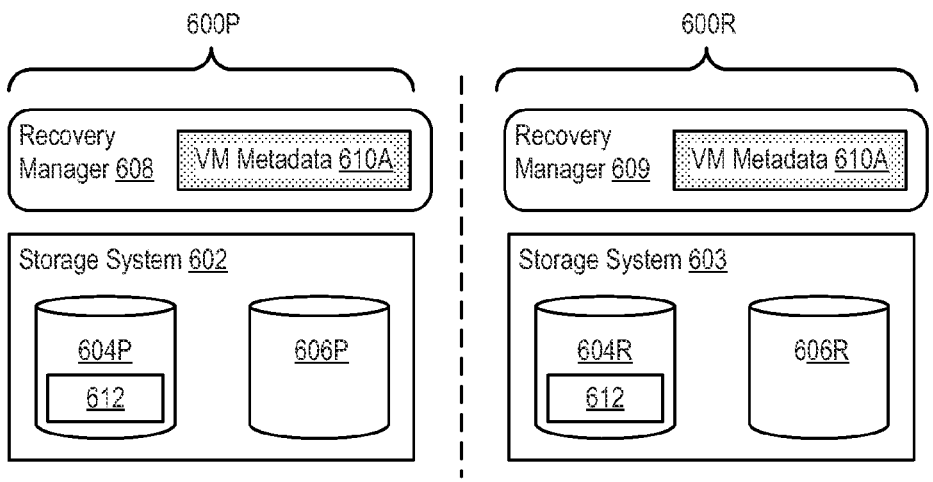
FIG. 6A t=t₀
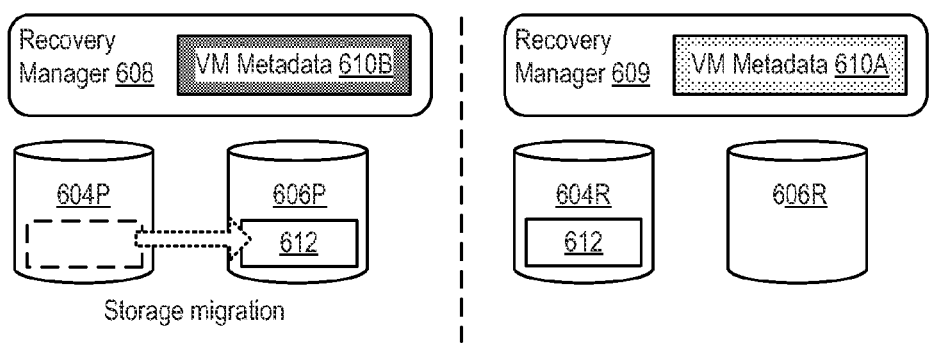
FIG. 6B t=t₁
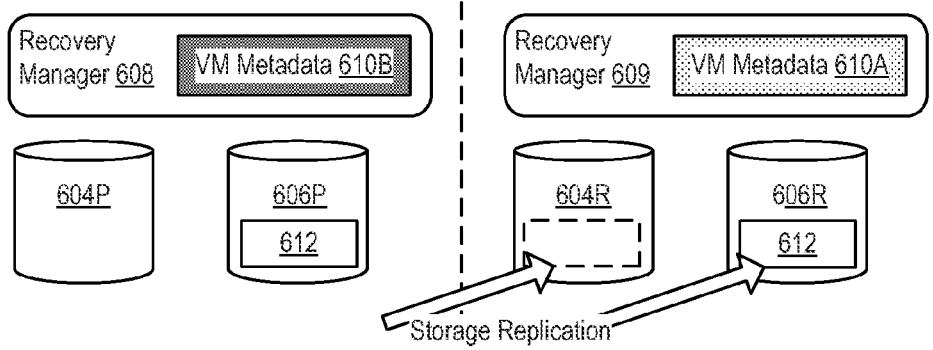
FIG. 6C t=t₂
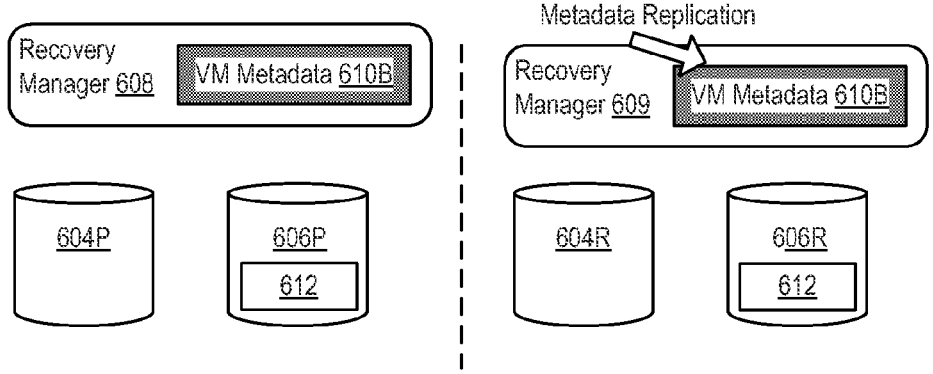
FIG. 6D t=t₃

PREVENTING MIGRATION OF A VIRTUAL MACHINE FROM AFFECTING DISASTER RECOVERY OF REPLICA

CROSS-REFERENCE TO RELATED APPLICATION(S)

This application is related to U.S. patent application Ser. No. 14/473,664 filed Aug. 29, 2014, also entitled "Preventing Migration of a Virtual Machine from Affecting Disaster Recovery of Replica" which is assigned to the assignee of this application, and the entire contents of which are incorporated by reference herein.

BACKGROUND

Storage replication is a data protection strategy in which data objects (e.g., files, physical volumes, logical volumes, file systems, etc.) are replicated to provide some measure of redundancy. Storage replication may be used for many purposes, such as ensuring data availability upon storage failures, site disasters, or planned maintenance. Storage replication may be managed directly between storage systems, such as storage arrays, in an approach referred to as storage-based replication or array-based replication (ABR), in contrast to host-based replication.

In virtualized computer systems, in which disk images of virtual machines are stored in storage arrays, disk images of virtual machines are migrated between storage arrays as a way to balance the loads across the storage arrays. For example, the Storage VMotion™ product that is available from VMware Inc. of Palo Alto, Calif. allows disk images of virtual machines to be migrated between storage arrays without interrupting the virtual machine whose disk image is being migrated or any applications running inside it. However, in certain situations, migrations of virtual machines can interfere with storage replication and affect disaster recovery at the replication site.

BRIEF DESCRIPTION OF THE DRAWINGS

FIGS. 6A to 6D are block diagrams depicting an example migration operation in which there is a replication mismatch between the storage replication of the source and target datastores and the metadata replication between recovery managers.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
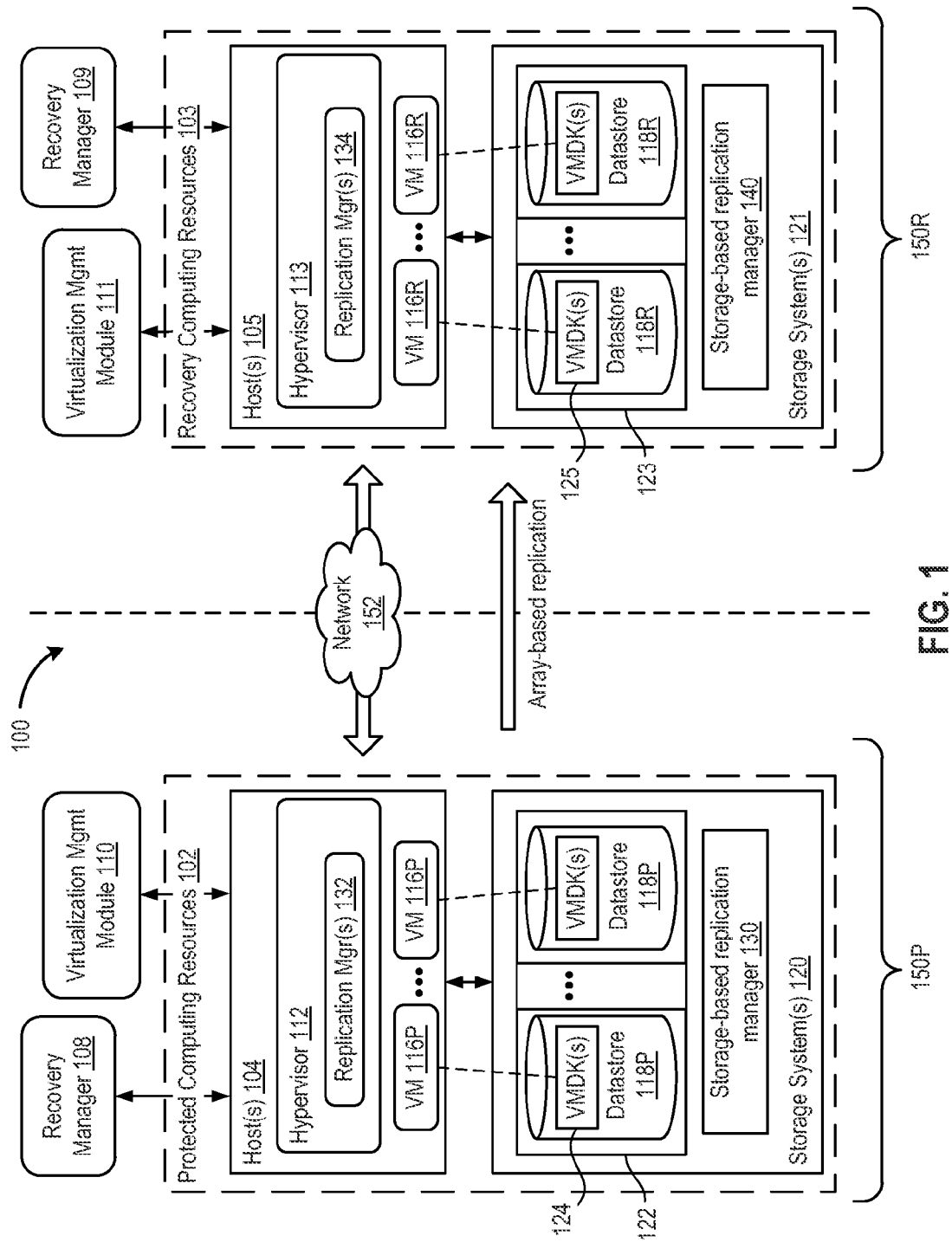
FIG. 1 is a block diagram that illustrates a computer system in which one or more embodiments may be utilized.

FIG. 1 is a block diagram that illustrates a computer system 100 in which one or more embodiments may be utilized. Computer system 100 includes a protected site 150P and a recovery site 150R communicatively connected by a network 152. Sites 150P, 150R include collections of computing resources that are physically and/or logically divided within computer system 100. Protected site 150P includes protected computing resources 102, a recovery manager 108 and a virtualization management module 110. Similarly, recovery site 150R includes recovery computing resources 103, a recovery manager 109, and a virtualization management module 111. Computing resources 102, 103 can include computer systems, storage systems, networks and associated devices, and the like. Protected site 150P includes protected virtual machines (VMs 116P) executing on protected computing resources 102. An administrator can organize protected VMs 116P into protection groups. A "protection group" is a collection of VMs and datastores that is a logical unit of failover (from the user's perspective, for example, a protection group might contain a logical set of applications). Protection groups may be configured in recovery manager 108 by the user as a logical container of VMs that are replicated to a recovery site. Protected VMs 116P can be transferred from operating on the protected computing resources to recovery computing resources at recovery site 150R. Protected VMs 116P can be transferred between sites 150P and 150R in response to unplanned migration (e.g., resource failure, disaster, etc.) or planned migration (generally referred to as migration). Protected VMs on protected site 150P can be failed over to recovery site 150R. Protected VMs on recovery site 150R can be failed back to protected site 150P. The terms "failed over" and "failed back" encompass both planned and unplanned migrations of VMs between sites 150P and 150R.

Protected computing resources 102 include one or more host computers (i.e., host(s) 104) that execute one or more hypervisors 112, which include virtual machines (VMs) 116P that are protected. Recovery computing resources 103 include one or more host computers (i.e., host(s) 105) that execute one or more hypervisors 113, which include recovery VMs 116R that will become available after a failover of the corresponding protected VMs. Each of hypervisor 112 and 113 can be a "bare-metal" hypervisor, such as vSphere® ESXi™ commercially available from VMware, Inc. of Palo Alto, Calif. Alternatively, one or more of hypervisor(s) 112 can execute on top of an operating system (OS), which is executing on a host. Hypervisors 112 and 113 provide a software interface layer that abstracts computing resource hardware into virtualized hardware, enabling sharing of the computing resource hardware among virtual machines.

Hypervisor 112 acts as an interface between VMs 116P and protected computing resources 102, and hypervisor 113 acts as an interface between VMs 116R and recovery computing resources 103. Hypervisors 112 and 113 may run on top of an operating system or directly on respective computing resources.

VMs 116P and 116R share hardware resources of protected computing resources 102 and recovery computing resources 103, respectively. Each VM typically includes a guest operating system (OS) and virtualized system hardware (not shown) implemented in software to emulate corresponding components of an actual computer system. VMs 116P are part of protected group(s) of VMs, and hence the computing resources shared by VMs 116P are referred to as "protected computing resources." VMs 116R represent VMs which will become available after a failover or disaster recovery, and hence the computing resources shared by VMs 116R are referred to as "recovery computing resources."

Each of host(s) 104 is coupled to one or more storage systems 120, and each of host(s) 105 is coupled to one or more storage systems 121. Storage systems 120, 121 can include one or more mass storage devices, associated networks, and the like. Storage system 120 stores protected datastores 118P, and storage system 121 stores recovery datastores 118R corresponding to protected datastores 118P. A datastore is a logical container, analogous to a file system, which hides specifics of each storage device and provides a uniform model for storing files that a hypervisor uses to run virtual machines. A datastore can store one or more virtual disks, which store files and data for guest operating systems and applications running in the virtual machines. A datastore can also store VM configuration file(s), file(s) that contain VM snapshot(s), and the like used by a hypervisor to configure and run VMs. Datastores 118P store files for protected VMs 116P, and datastores 118R store files for recovery VMs 116R. Datastores 118P, 118R are abstracted from the underlying mass storage of storage systems 120, 121. For example, a given datastore can be stored on one or more logical storage units 122 and 123, respectively, sometimes referred to as logical volumes or logical unit numbers (LUNs), which are, effectively, logical block storage devices exposed by the storage system. Alternatively, a given logical storage unit of a storage system can store multiple datastores, and a datastore can span across multiple logical storage units.

Computing system 100 includes a virtualization management module 110 that may communicate to the plurality of hosts 104. In one embodiment, virtualization management module 110 is a computer program that resides and executes in a central server, which may reside in computing system 100, or alternatively, running as a VM in one of hosts 104. One example of a virtualization management module is the vCenter® Server product made available from VMware, Inc. of Palo Alto, Calif. Virtualization management module 110 is configured to carry out administrative tasks for the computing system 100, including managing hosts 104, managing VMs running within each host 104, provisioning VMs, migrating VMs from one host to another host, load balancing between hosts 104, creating resource pools comprised of computing resources of hosts 104 and VMs 116P, modifying resource pools to allocate and de-allocate VMs and physical resources, and modifying configurations of resource pools. It is noted that virtualization management module 111 may be configured similarly.

In one embodiment, virtualization management modules 110 is configured to perform storage migration which migrates one or more virtual disks of a virtual machine or the entire virtual machine (on a "source" datastore) to a different datastore (i.e., "destination" datastore). Such storage migration may be performed whether virtual machines are offline or are running, which is sometimes referred to as a "live" migration, without service disruption. One example storage migration technology may be found in Storage vMotion™ technology made commercially available by VMware, Inc. of Palo Alto, Calif.

Virtualization management module 110 is configured to perform manual storage migration in response to user input, or in other embodiments, automatic storage migration, for purposes of balancing the I/O load or managing free space across datastores. In one embodiment, virtualization management module 110 may automate I/O and space load balancing in datastore clusters. Virtualization management module 110 may monitor the I/O and space usage of all the datastore in a cluster and automatically (or with an explicit user confirmation) initiate a storage migration operation for certain virtual disks or entire virtual machines when needed. This enables users to manage their virtual datacenter easily and efficiently without any manual intervention. Virtualization management module 110 may be configured to evacuate a datastore when the datastore needs to be placed in a maintenance mode, i.e., taken out of use to be serviced. In such cases, virtualization management module 110 triggers a live storage migration for all virtual machines residing on that datastore. In some embodiments, virtualization management module 110 may suggest an initial placement of a virtual disk or a virtual machine during a virtual machine provisioning workflow.

In one or more embodiments, storage system(s) 120 include storage-based replication manager(s) 130, and storage system(s) 121 include storage-based replication manager(s) 140. Storage-based replication managers 130, 140 can control replication of datastores and associated VMs between sites 150P and 150R. In another embodiment, hypervisor(s) 112 can include replication manager(s) 132, and hypervisor(s) 113 can include replication manager(s) 134. Replication managers 132, 134 can control replication of VMs between sites 150P and 150R. Some hypervisors can replicate individual VMs to existing datastores. Other hypervisors can replicate the VMs by replicating the datastores on which the VMs reside. Storage-based replication managers 130, 140 can operate together with (host-based) replication managers 132, 134, in place of replication managers 132, 134, or can be omitted in favor of only replication managers 132, 134.

Recovery manager 108 is configured to coordinate with a corresponding recovery manager 109 to perform disaster recovery operations on protected computing resources (e.g., VMs 116P, datastores 118P) of protected site 150P using corresponding recovery computing resources 103 (e.g., VMs 116R, datastores 118R) of recovery site 150R. In some embodiments, recovery managers 108, 109 may be executing as a virtual machine or on a physical server (not shown). Recovery managers 108, 109 enable a user to plan the availability of virtual workloads in times of a disaster, for example, by enabling the user to recover their virtual workloads quickly when the production datacenter (i.e., protected site 150P) is unavailable. In one embodiment, recovery managers 108, 109 are configured to orchestrate a planned failover of virtual workloads along with the associated storage across sites 150P and 150R, a test failover of virtual workloads along with the associated storage on the recovery site 150R, or unplanned or disaster failover of virtual workloads along with the associated storage across sites 150P and 150R. An example recovery manager 108 that provides disaster recovery is vSphere® vCenter™ Site Recovery Manager™ commercially available from VMware, Inc. of Palo Alto, Calif.

In order to protect virtual workloads, a user may configure recovery managers 108, 109 with a set of replicated datastores that are critical for their business operations. Recovery manager 108 may discover these replicated datastores from storage system 120 and make the datastores available for disaster recovery protection. Datastores may be replicated independently (i.e., as standalone datastores) or as part of a consistency group. A consistency group is defined as a set of datastores for which the write order is preserved during a replication.

Storage-based replication managers 130, 140 may perform replication in a synchronous or asynchronous manner. In synchronous replication, any data written to the protected site is also written to the recovery site, and I/O acknowledgement is returned to the writer only after receiving acknowledgment from both sites. This approach, however, may suffer from performance and latency issues and often requires the recovery site to be physically proximate to the protected site to alleviate such latency issues. In asynchronous replication, subsequent I/O operations at the protected site are not held up by replicated I/O at the recovery site. Rather, asynchronous replication to the recovery site may occur based on a schedule or a constraint known as a Recovery Point Objective (RPO) that typically specifies an upper limit on the potential data loss upon a failure or disaster. An RPO can be specified in terms of time, write operations, amount of data changed, and the like. For example, if an RPO for a certain set of data objects is specified as twenty-four hours, then a storage replication method designed to support this RPO would need to replicate such a set of data objects at least every twenty-four hours. This particular method replicates data object contents in such a way that the RPO for each data object is met. This approach improves performance, at the risk of data loss if the protected site fails before data have been replicated to the recovery site.

In operation, while protected VMs 116P are operating, recovery VMs 116R are not operating, and datastores 118P are being replicated to datastores 118R. In case of disaster recovery, initially none of VMs 116P and 116R are operating. Recovery managers 108, 109 can begin a disaster recovery workflow that processes datastores 118R in order to bring online VMs 116R, effectively failing over VMs 116P to VMs 116R. After the disaster recovery workflow is complete, VMs 116R are operating in place of VMs 116P. The same process may works in reverse for fail back of recovery VMs 116R to protected VMs 116P.

In every pair of replicated storage devices, one datastore is the replication source and the other is the replication target. Data written to the source datastore is replicated to the target datastore on a schedule controlled by replication manager 130 of storage system 120.

In one embodiment, when a VM 116P is protected by recovery manager 108, there are at least two replication mechanisms involved. First, storage-based replication is performed by storage system 120 at protected site 150P to replicate data (e.g., virtual machine files) to the peer storage system 121 at recovery site 150R. Second, metadata replication is performed by recovery manager 108 to replicate additional metadata associated with a VM, such as, the identity of the replica device and the path at which the VM replica can be found, to the peer recovery manager 109 at recovery site 150R.

However, these replication mechanisms are typically asynchronous with different replication schedules (i.e., RPO), as described above. Thus, if a VM is migrated from one datastore to another (within protected site 150P), there may be a window of time in which the replica (i.e., the corresponding datastore 118R at recovery site 150R) is out of sync with the production data. In some situations, this may lead to the recovery managers' inability to recover a virtual machine from the replica at recovery site 150R should a disaster happen during this out-of-sync window. This could effectively lead to the user completely losing the affected virtual machine. This problem is illustrated in FIGS. 2A to 2D below. In addition, there could a mismatch between the storage replication in storage systems 120, 121 and the metadata replication in recovery managers 108, 109, as described later in conjunction with FIGS. 6A to 6D.

Replication Mismatch Between Source and Destination of Migration

Figure 2A:
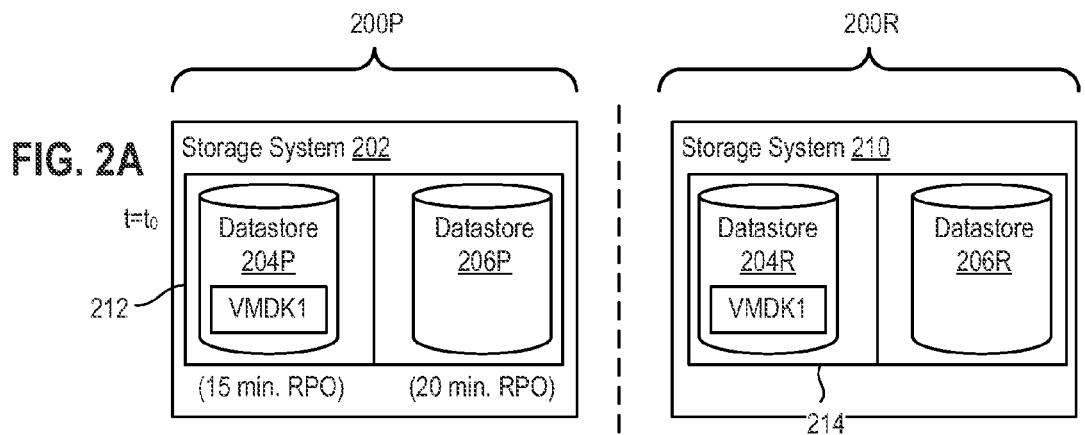
FIGS. 2A to 2D are block diagrams depicting a migration operation in which there is a replication mismatch between a replica of a source datastore and a replica of a destination datastore.

FIGS. 2A to 2D are block diagrams depicting a migration operation in which there is a replication mismatch between a replica of a source datastore and a replica of a destination datastore. FIG. 2A depicts a protected site 200P and a corresponding recovery site 200R. Protected site 200P includes a storage system 202 providing a plurality of logical storage units 212 on which datastores 204P and 206P are stored. Storage system 202 at protected site 200P is configured to perform storage-based replication of logical storage units 212 with a storage system 210 at recovery site 200R. As a result, storage system 210 includes a plurality of logical storage units 214 having recovery datastores 204R and 206R, which are replicas of protected datastores 204P and 206P, respectively. Sites 200P, 200R are understood to include components similar to sites 150P, 150R shown in FIG. 1, but have been omitted for clarity of illustration.

In FIG. 2A, at an initial state ($t=t_0$), datastore 204P stores VM data, including virtual machine files, virtual disk files, virtual state files, etc., for a VM1 (identified as VMDK1).

Figure 2B:
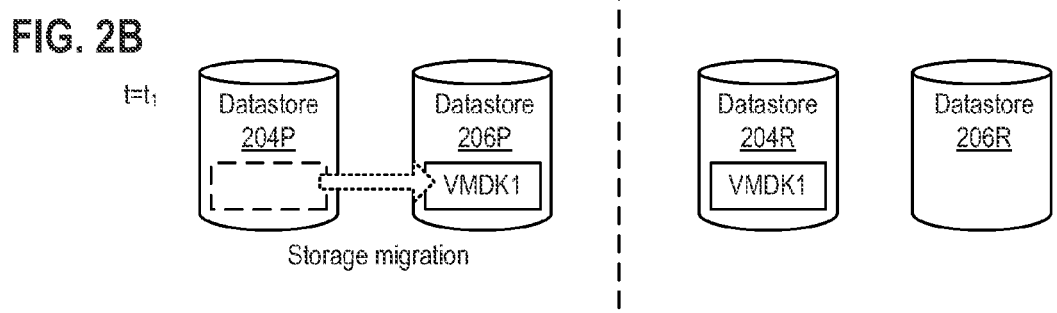

In FIG. 2B, at $t=t_1$, a storage migration operation is initiated to migrate virtual machine files of the VM from (source) datastore 204P to (destination) datastore 206P within site 200P. Once the VM data has been copied to destination datastore 206P, the VM data is deleted from source datastore 204P, as depicted in dashed outline.

If source datastore 204P and destination datastore 206P do not belong to a same consistency group from a replication perspective, datastores 204P, 206P are likely to be replicated with different replication schedules. For example, as shown in FIG. 2A, datastore 204P has an RPO of 15 minutes, while datastore 206P has an RPO of 20 minutes. It is understood that even if the datastores had the same RPO setting, the asynchronous nature of storage replication may still result in replication mismatches during windows of time (albeit brief) in which one datastore has been updated before the other. As a result of these mismatches, in some cases, the deletion of VM data from the source datastore could be replicated to the recovery site before the data migration to the destination datastore is replicated to the recovery site, as depicted in FIGS. 2C and 2D.

Figure 2C:
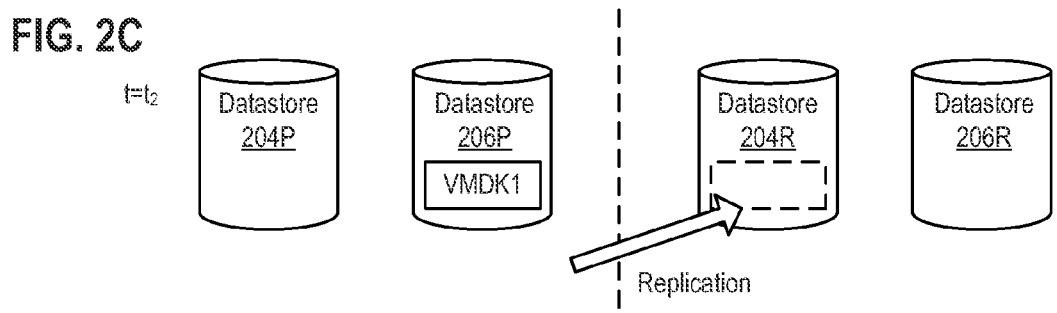
Figure 2D:
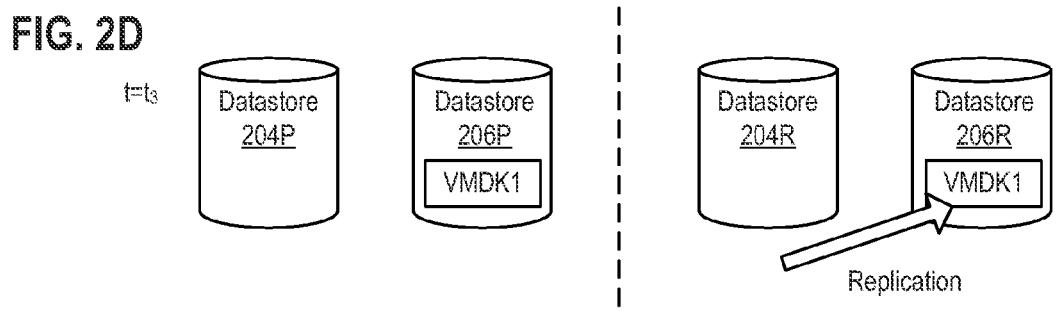

In FIG. 2C, at time $t=t_2$, the deletion of the VM data from source datastore 204P is replicated to recovery site 200R at datastore 204R before the data migration of VMDK1 to datastore 206R is replicated to recovery site 200R (at time $t=t_3$), as shown in FIG. 2D. As shown in FIG. 2C, the VM data have already been deleted from datastore 204R, and the migrated VM data have not been fully replicated to datastore 206R. Consequently, this is a window of time (e.g., between $t=t_2$ and $t=t_3$) during which neither the replica (i.e., datastore 204R) of source datastore 204P nor the replica (i.e., datastore 206R) of destination datastore 206P will have the full copy of the VM data. If a failover were initiated for the given VM during this window of time, recovery managers 108, 109 would not have the requisite VM data to recover the VM at recovery site 200R, and irrecoverable data loss may occur.

For example, datastore 204P is replicated at time t=7 min., thereby fulfilling its 15-minute RPO by replicating at least once (up to) every 15 minutes. As such, the window of time during which neither replica has the full copy of VM data begins at t=7 min. to the time when the other datastore 206P replicates, which could last until time t=20 min., i.e. the latest time possible to fulfill its 20-minute RPO.

Accordingly, embodiments of the present disclosure provide a mechanism to prevent virtual machine storage migrations, either automatically or manually initiated, when a potential mismatch between a source datastore and a destination datastore exists. To prevent such potentially dangerous VM migrations, storage migration functionality of virtualization management module 110 is modified to become aware of the replication properties for the source datastore and a destination datastore as provided by the underlying storage systems. Other approaches to this problem have attempted to configure the components that control storage migration to talk directly to an underlying storage array to discover the replication properties of the datastore involved. However, in practice, this can be difficult to implement as no common application programming interface (API) is available that could be used to talk to various storage arrays provided by different vendors. Further, by being agnostic of the underlying properties of datastores, embodiments of the present disclosure provide storage migration functionality that can support non-array backed datastores, such as datastores backed by local storage.

Figure 3:
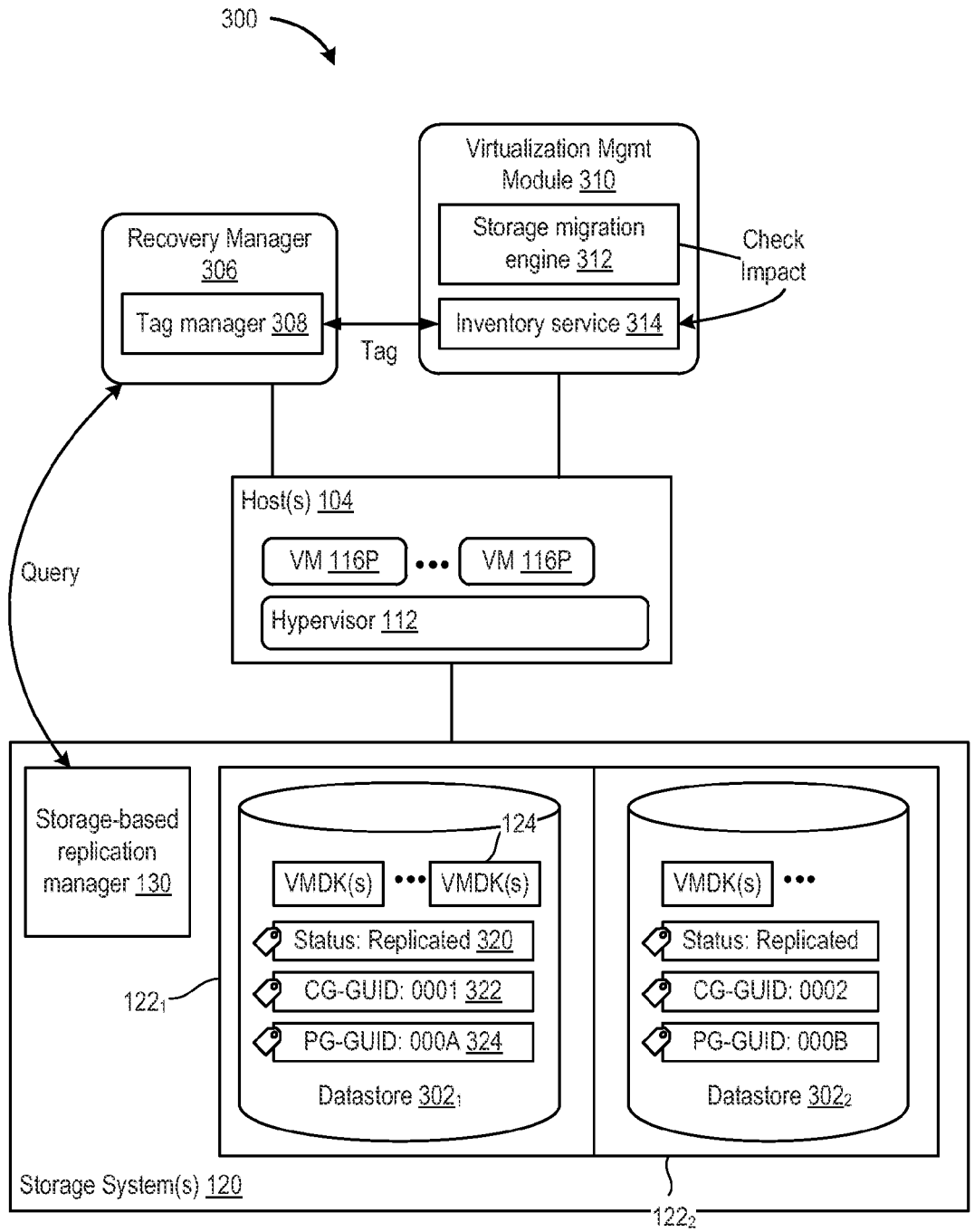
FIG. 3 is a block diagram depicting a computer system configured to prevent storage migration based on replication mismatches between a source datastore and a destination datastore, according to one embodiment of the present disclosure.

FIG. 3 is a block diagram depicting a computer system 300 configured to prevent storage migration based on replication mismatches between a source datastore and a destination datastore, according to one embodiment of the present disclosure. Computer system 300 is a protected site, similar to computer system 100 of FIG. 1, and includes a storage system 120 having a replication manager 130 configured to perform storage-based replication with a corresponding storage system (not shown) at a recovery site. Storage system 120 includes logical storage units $122_1$ and $122_2$ having datastore $302_1$ and $302_2$ formatted to store virtual machine files 124 associated with VMs 116P running on host 104.

Computer system 300 includes a recovery manager 306 configured to discover replication properties of all datastores 302 in a storage system 120. In one embodiment, recovery manager 306 includes a tag manager 308 configured to tag replicated datastores 302 with special tags indicating (storage-based) replication properties of the datastores. In some embodiments, recovery manager 306 may tag a datastore with a status tag indicating whether the datastore is replicated or not, with a consistency group tag indicating which consistency group the datastore belongs to, and a protection group tag indicating in which protection group the datastore is protected in recovery manager 306. Other types of special tags may be utilized.

Computer system 300 further includes a virtualization management module 310 having a storage migration engine 312 and an inventory service 314. Storage migration engine 312 is configured to analyze tags of a datastore to evaluate a potential impact of a requested storage migration of a VM on the disaster recovery protection of that VM (e.g., by recovery manager 306). Inventory service 314 is configured to maintain an inventory of objects corresponding to physical and virtualized computing resources of system 300, including hosts 104, VMs 116P, datastores 302, logical storage units 122, and storage systems 120. The inventory maintained by inventory service 314 includes locations of each physical and virtualized computing resource, such as which datastore is stored in which logical storage unit, and other properties associated with each physical and virtualized computing resource of system 300. Inventory service 314 is configured to handle queries for inventory objects and their associated objects. Inventory service 314 is configured to add, remove, and/or modify tags assigned to inventory objects, such as datastores, which can be used to categorize replication properties. In one embodiment, tag manager 308 of recovery manager acts as a proxy for adding and removing tags via inventory service 314 of virtualization management module 310. The tags are searchable metadata, and as such, inventory service 314 is configured to provide inventory objects and their replication properties based on queries for certain tags, for example, from storage migration engine 312.

Figure 4:
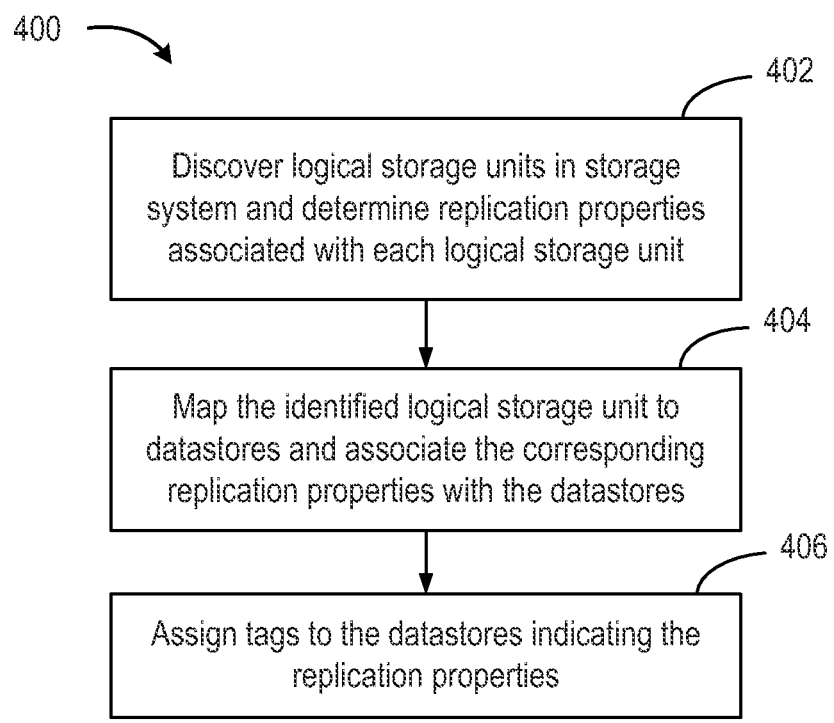
FIG. 4 is a flow diagram depicting a method for tagging a datastore with replication properties, according to one embodiment of the present disclosure.

FIG. 4 is a flow diagram depicting a method 400 for tagging a datastore with replication properties, according to one embodiment of the present disclosure. While method 400 is described in conjunction with components of the system shown in FIG. 3, other components in computer system 300 may perform the steps of method 400, as well as other systems may perform the described method.

Method 400 begins at step 402, where recovery manager 306 discovers one or more logical storage units 122 of storage system 120 and determines one or more replication properties associated with each logical storage unit 122. In one embodiment, recovery manager 306 communicates with storage system 120 via a vendor-supported common interface referred to as a storage replication adapter (SRA). Recovery manager 306 may query storage system 120 (e.g., via SRA) for a device configuration, which includes identification of the plurality of logical storage units 122 (e.g., LUNs) and their associated replication properties. Recovery manager 306 may query storage system 120 periodically, for example, once every 24 hours, although any periodicity may be used. Recovery manager 306 may also query storage system 120 in response to user input that forces a rescan of storage system 120.

In one or more embodiments, recovery manager 306 receives a replication topology of logical storage units 122 indicating which of (if any) logical storage units 122 are configured for storage-based replication, and other metadata associated with replication. If storage system 120 supports consistency groups, storage system 120 may also report which consistency groups (if any) each of logical storage units 122 belongs to. As used herein, a consistency group refers to a set of datastores for which the write order is preserved during replication.

At step 404, recovery manager 306 maps logical storage units 122 of storage system 120 to datastores 302 stored therein, and associates the corresponding replication properties with datastores 302. Recovery manager 306 may query inventory service 314 to determine which datastores 302 are stored in which logical storage unit(s) 122 or portions of logical storage units 122. In one embodiment, a datastore is deemed replicated if all of its underlying logical storage unit(s) 122 are configured for replication. This all-or-nothing principle may be applied to the other replication properties of datastores. For example, a datastore is deemed to be a member of a given consistency group if all of its underlying logical storage unit(s) are members of that consistency group.

At step 406, recovery manager 306 assigns one or more tags to datastores 302 indicating the associated replication properties, if any. In one embodiment, tag manager 308 of recovery manager 306 directs inventory service 314 to add one or more custom tags to inventory objects corresponding to the mapped datastores 302 indicating the associated replication properties. In an alternative embodiment, recovery manager 306 writes the one or more tags directly to datastore 302, such that the tags are accessible to other components within system 300 that can access datastore 302.

In one embodiment, recovery manager 306 tags all replicated datastores with a replication status tag 320 (e.g., Status="Replicated"). Recovery manager 306 tags all datastores that are part of a consistency group with a consistency group tag 322 which contains a unique group identifier ("<Consistency-Group-GUID>"). In this way, all datastores that belong to the same consistency group will have the same tag assigned to them. Similarly, recovery manager 306 tags all datastores that are part of a protection group with a protection group tag 324 which contains a protection group identifier ("<Protection-Group-GUID>"). The tags assigned during step 406 may be categorized in inventory service 314 as being related to replication, so as to distinguish from other types of tags that might be assigned to the datastores and facilitate easy retrieval later on. The tag category of the assigned tags may be a distinct field of metadata, or in other embodiments, may be specified using a predetermined prefix in the tag name (e.g., "SRM-_____") that can be text searched.

In the example shown in FIG. 3, recovery manager 306 discovers a first logical storage unit $122_1$ with array-based replication enabled and belonging to Consistency Group 1 and to Protection Group A, and a second logical storage unit $122_2$ with storage-based replication enabled and belonging to Consistency Group 2 and to a Protection Group B. Recovery manager 306 then determines that datastore $302_1$ is stored within unit $122_1$, and associates the replication properties of unit $122_1$ (e.g., replication enabled, Consistency Group 1, Protection Group A) with datastore $302_1$ itself. A similar mapping is performed to associate replication properties of unit $122_2$ with datastore $302_2$. Then tag manager 308 of recovery manager 306 tags datastore $302_1$ with a replication status tag 320 indicating datastore $302_1$ is configured to storage-based replication (i.e., "Status: Replicated"), with a consistency group tag 322 specifying the identifier associated with Consistency Group 1 (e.g., "CG-GUID: 0001"), and a protection group tag 324 specifying the identifier associated with Protection Group A (e.g., "PG-GUID: 000A"). Tag manager 308 assigns tags to second datastore $302_2$ in a similar manner as shown in FIG. 3.

Recovery manager 306 keeps tags of datastore 302 up-to-date by monitoring the replication topology reported by storage system 120 (e.g., as in step 402). For example, when the protection group properties of a datastore change, recovery manager 306 will react accordingly and add/remove protection group tags 324 as necessary.

Each time that storage migration engine 312 needs to consider a potential VM migration, storage migration engine 312 analyzes the tags assigned to the datastore(s) that are subject to the potential migration to evaluate the potential impact of the migration on the disaster recovery protection of VMs stored on those datastore(s).

Figure 5:
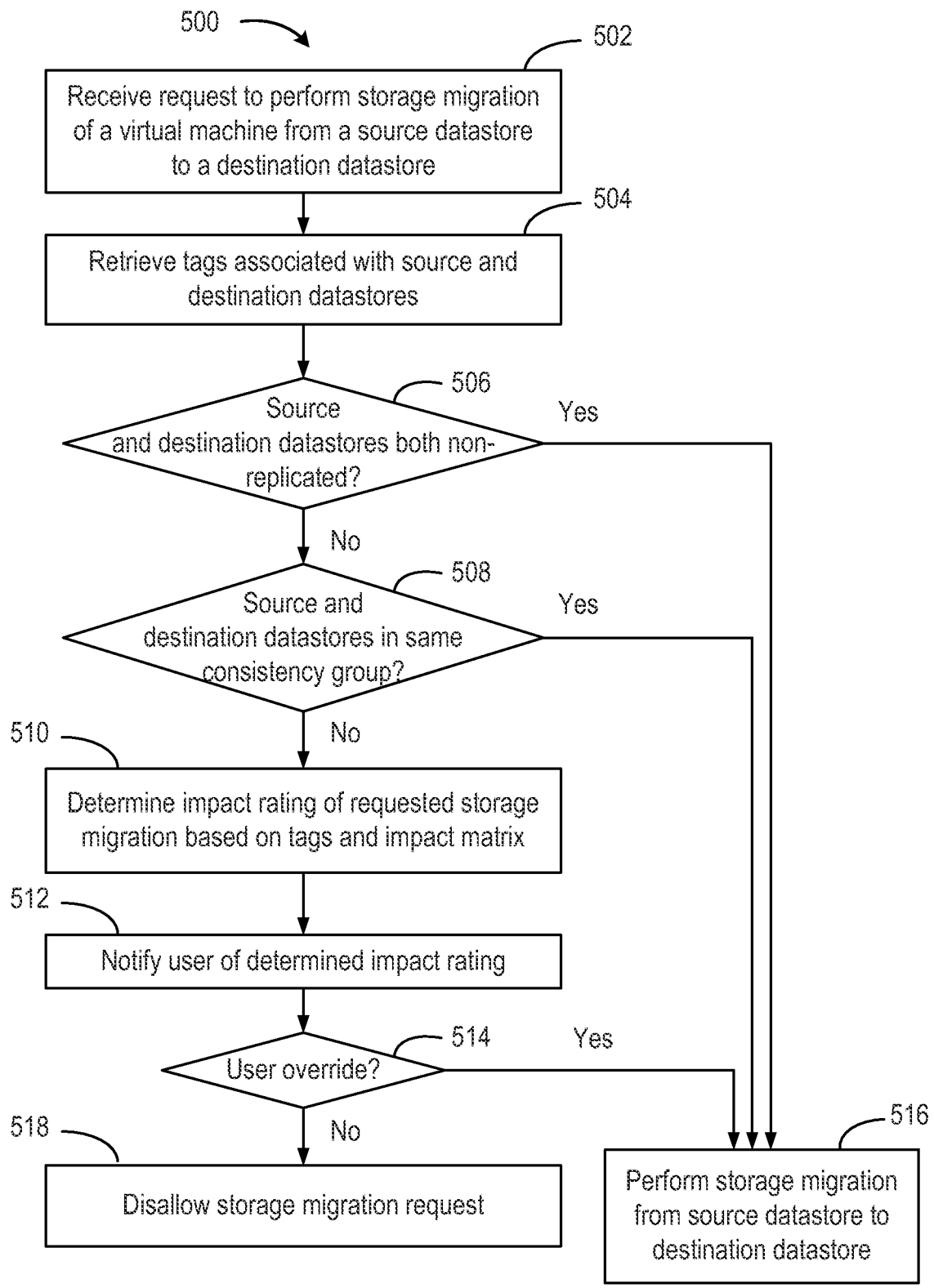
FIG. 5 is a flow diagram depicting a method 500 for preventing storage migration from affecting the disaster recovery of a replica, according to one embodiment of the present disclosure.

FIG. 5 is a flow diagram depicting a method 500 for preventing storage migration from affecting the disaster recovery of a replica, according to one embodiment of the present disclosure. While method 500 is described in conjunction with components of the system shown in FIG. 3, other components in computer system 300 may perform the steps of method 500, as well as other systems may perform the described method.

Method 500 begins at step 502, where storage migration engine 312 receives a request to perform storage migration of a virtual machine from a source datastore to a destination datastore. For example, storage migration engine 312 might field a request to migrate virtual machine files from one datastore $302_1$ to another datastore $302_2$ at a protected site. The storage migration may be manually requested by a user, or may be automatically requested during redistribution and/or storage load balancing (e.g., Storage Distributed Resource Scheduler technology made available by VMware, Inc. of Palo Alto, Calif.).

At step 504, storage migration engine 312 retrieves any tags associated with the source and destination datastores. In one embodiment, storage migration engine 312 queries inventory service 314 for any tags that are assigned to the source datastore and the destination datastore and that are categorized as replication-related.

At step 506, storage migration engine 312 determines whether the source datastore and the destination datastore are both non-replicated. In one embodiment, storage migration engine 312 checks replication status tag 320 of source datastore and replication status tag 320 of destination datastore. If both non-replicated, storage migration engine 312 proceeds to step 516, and performs the requested storage migration of the virtual machine from the source datastore to the destination datastore. In other words, migrating between non-replicated datastores is immediately allowed.

Responsive to determining to that the source datastore and the destination datastore are not both non-replicated, storage migration engine 312 proceeds to step 508. It is noted that this operation covers cases where the source and destination datastores are both replicated, and cases where one datastore is replicated and the other is not. In an alternative embodiment, if only one datastore is replicated (i.e., the other datastore is not replicated), storage migration engine 312 may proceed directly to step 510 instead.

At step 508, storage migration engine 312 determines whether the source datastore and the destination datastore are members in a same consistency group. In one embodiment, storage migration engine 312 compares the identifier found in consistency group tag 322 associated with the source datastore with the identified value found in consistency group tag 322 associated with the destination datastore. If the same consistency group, storage migration engine 312 proceeds to step 516, and performs the requested storage migration. In other words, migrating virtual machine storage between replicated datastores in a same consistency group is immediately allowed.

At step 510, storage migration engine 312 determines an impact rating of the request storage migration based on the retrieved tags and further based on an impact matrix. The impact rating may vary between a "low" impact rating, a "mild" impact rating, a "severe" impact rating, although other rating values may be used. The impact matrix represents the variety of scenarios in which the source datastore has different replication properties than the destination datastore which might impact disaster recovery of the datastore at the recovery site.

In one embodiment, storage migration engine 312 may determine a "mild" impact rating for a storage migration from a non-replicated datastore to a replicated datastore based on a determination that both source and target datastores are not in any protection groups. In this case, a "replication overhead" fault may be generated. In another embodiment, storage migration engine 312 may determine a mild impact rating for a storage migration of a VM from a non-replicated datastore to a replicate datastore based on a determination that only the target datastore is in a protection group. In this case, a "protection overhead" fault may be generated. In one embodiment, storage migration engine 312 may determine a heightened "mild" impact rating for a storage migration of a VM from a replicated source datastore to a non-replicated target datastore based on a determination that both source and target datastores are not in any protection group, and raise a fault indicating a loss of replication may occur. In another embodiment, storage migration engine 312 may determine a "severe" impact rating for a storage migration of a VM from a replicated source datastore to a non-replicated target datastore based on a determination that the source datastore was in a protection group, and the target datastore is not, and raise a fault indicating a loss of protection may occur. These impact ratings are summarized in the example impact matrix shown in Table 1 below.

target is not), and raises a "replication loss of protection" fault. In some embodiments, storage migration engine 312 determines a mild impact rating for such a storage migration based on a determination that only the target datastore is in a protection group (and the source is not), and raises a "replication protection overhead" fault. In some embodiments, storage migration engine 312 determines a mild impact rating for such a storage migration based on a determination that both the source and target datastores are not in any protection groups, and raises a "replication no protection" fault. The above described impact ratings are summarized in the example impact matrix shown in Table 2 below.

TABLE 2

| DS to DS | CG → CG | CG → Diff CG | PG → PG | PG → Diff PG | PG → No PG | No PG → PG | No PG → No PG | Impact | Fault |
|---|---|---|---|---|---|---|---|---|---|
| Replicated to Replicated | X | | | | | | | OK | N/A |
| | | X | X | | | | | MILD+ | Replication Within Group |
| | | X | | X | | | | SEVERE | Replication Outside Group |
| | | X | | | X | | | SEVERE+ | Replication Loss of Protection |
| | | X | | | | X | | MILD | Replication Protection Overhead |
| | | X | | | | | X | MILD | Replication No Protection |

TABLE 1

| Datastore to Datastore | Only Source in PG (PG → No PG) | Only Target in PG (No PG → PG) | Both not in any PGs (No PG → No PG) | Impact | Fault |
|---|---|---|---|---|---|
| Non-replicated to Non-replicated | | | | OK | N/A |
| Non-replicated to Replicated | | X | | MILD | Replication Overhead |
| Replicated to Replicated | X | | | MILD | Protection Overhead |
| Replicated to Non-Replicated | | | X | MILD+ | Loss of Replication |
| | X | | | SEVERE++ | Loss of Protection |

In situations where a storage migration of a VM from a replicated source datastore and a replicated target datastore is requested, where the source and target datastores are in different consistency groups, storage migration engine 312 may determine impact ratings as follows. In one embodiment, storage migration engine 312 determines a heightened mild impact rating for such a storage migration based on a determination that the source and target datastores are in the same protection group(s), and raises a "replication within group" fault. In some embodiments, storage migration engine 312 determines a severe impact rating for such a storage migration based on a determination that the source and target datastores have different protection group(s), and raises a "replication outside group" fault. In some embodiments, storage migration engine 312 determines a heightened severe impact rating for such a storage migration based on a determination that only the source datastore was in a protection group (and the In one or more embodiments, storage migration across datastores is allowed to proceed if the source datastore and the destination datastore are in the same consistency group, or if both datastores are not being replicated by the underlying storage system. In one embodiment, for datastores arranged in clusters for load balancing purposes, storage migration engine 312 may perform automatic VM migration between datastores from the same consistency group. For other migrations, storage migration engine 312 may generate manual recommendations ranging from low impact to high impact, as described above. The user (e.g., administrator) may still execute these migrations if deemed by the user to be necessary, however it is noted that the disaster recovery protection may be at risk, and the user has to override the warning to perform the requested storage migration.

At step 512, storage migration engine 312 notifies a user (e.g., system administrator) of the determined impact rating. In one embodiment, storage migration engine 312 presents the impact rating as an alert or warning in a user interface used by the user to access virtualization management module 310. In some embodiments, storage migration engine 312 may transmit an alert (e.g., via e-mail, SMS message, instant message) to the user.

At step 514, storage migration engine 312 determines whether the user has overridden the rejection of the storage migration. In one embodiment, the alert presented (or transmitted) in step 512 may include a user interface element configured to receive authorization from the user to override the rejection of the storage migration (e.g., "Override?" "Are you sure?"). Responsive to determining that the user has overridden the rejection of the storage migration, storage migration engine 312 proceeds to step 516, and performs the requested storage migration of the virtual machine(s) from the source datastore to the destination datastore. Otherwise, at step 518, storage migration engine 312 disallows its storage migration request.

Replication Mismatch Between Storage Migration and Metadata Migration

As mentioned above, another problem that can arise is a mismatch between storage replication performed by the underlying storage arrays (e.g., storage systems 120, 121), which replicates virtual machine files, and metadata replication in recovery managers 108, 109, which replicates metadata associated with a virtual machine, for example the identity of the replica storage device and the path at which the virtual machine replica can be found.

FIGS. 6A to 6D are block diagrams depicting an example migration operation in which there is a replication mismatch between the storage migration of a source and target datastores and the metadata replication between recovery managers. FIG. 6A depicts a protected site 600P and a corresponding recovery site 600R. Protected site 600P includes a storage system 602 storing datastores 604P and 606P. Storage system 602 at protected site 600P is configured to perform storage-based replication of datastores 604P and 606P with a storage system 603 at recovery site 600R. As a result, storage system 603 stores recovery datastores 604R and 606R, which are replicas of protected datastores 604P and 606P, respectively. Protected site 600P further includes a recovery manager 608 configured to coordinate disaster recovery procedures with a corresponding recovery manager 609 at recovery site 600R. Sites 600P, 600R are understood to include components similar to sites 150P, 150R shown in FIG. 1, but have been omitted for clarity of illustration.

In FIG. 6A, at an initial state ($t=t_0$), datastore 604P stores VM data 612 for a VM1, including virtual machine files, virtual disk files, virtual state files, etc. Recovery manager 608 tracks VM metadata 610A associated with VM1, for example, metadata indicating that the location of VM data 612 for VM1 is at datastore 604P. As datastore 604P is replicated using storage-based replication to recovery site 600R, datastore 604R stores a copy of VM data 612. Recovery manager 609 maintains a copy of VM metadata 610A indicating the location of VM data 612 for VM1 is also stored at the replica, datastore 604R.

As shown in FIG. 6B, at $t=t_1$, a storage migration operation is initiated to migrate VM data 612 from "source" datastore 604P to a "destination" datastore 606P. Once VM data 612 has been copied to destination datastore 606P, VM data 612 is deleted from source datastore 604P, as depicted in dashed outline. In this example, both source datastore 604P and destination datastore 606P are a part of the same consistency group from the replication perspective. As such, the order of writes across both datastores 604P and 606P will be preserved in both replica datastores 604R and 606R. Thus, the migration of VM data 612 is replicated "atomically" to datastore 604R (i.e., the replica of source datastore 604P) and datastore 606R (i.e., the replica of destination datastore 606P) at some subsequent time $t=t_2$, as shown in FIG. 6C. When datastores are configured in the same consistency group, there would not be the problematic situation when neither replica would contain VM data 612, as in the example depicted in FIG. 2C described above.

The VM metadata is updated to indicate the new location of VM1 at destination datastore 606P, depicted as metadata 610B. In order for recovery manager 609 to be able to successfully recover VM1 at this point, recovery manager 608 would also need to replicate the updated VM metadata 610B indicating, in part, the new location of VM1 at the replica of destination datastore 606P (i.e., datastore 606R) once the storage migration completes at protected site 600P. This metadata replication typically happens independently and asynchronously of the storage replication (of VM data 612) in storage system 120. As shown in FIG. 6D, at $t=t_3$, metadata replication is performed to update VM metadata from 610A to 610B.

However, if VM metadata 610B is replicated slower than VM data 612, there may be some time during which recovery manager 609 at recovery site 600R would think that VM1 should still be recovered from datastore 604R (i.e., the replica of source datastore 604P) even though datastore 606R (i.e. the replica of destination datastore 606P) already contains the latest VM data 612. For instance, this out-of-sync period occurs between time $t_2$ and time $t_3$ in the example depicted in FIGS. 6A to 6D. Conversely, if VM metadata 610B is replicated faster than VM data 612, there will be some time during which recovery manager 609 at recovery site 600R would think that VM1 should be recovered from datastore 606R (i.e., the replica of destination datastore 606P) even though datastore 606R does not yet contain the migrated VM data 612. In both cases, recovery manager 609 would not be able to recover VM1 during this replication out-of-sync window.

Accordingly, embodiments of the present disclosure provide a technique for detecting, during a failover operation, if there is a potential mismatch between the known location of the VM replica and the actual data in the replica presented by the storage array. To achieve this, the recovery manager at the recovery site is modified to recover VMs not only in the same datastore as the corresponding protected datastore, but also to recover VMs in a different datastore as the corresponding protected datastore. A VM migration engine is modified to store additional metadata in the VM files which are used by the recovery manager at the recovery site to find the appropriate instance of the VM in the replica. Prior techniques for VM failover remember the location of VM data, looks for the VM data in the recovered datastore, and fails if the VM is not found. Embodiments described herein search for all instances of VM data found within the recovered datastores, and selects the latest instance of VM data that corresponds to the recovered VM. As such, the described technique can handle scenarios where a user manually initiates a storage migration to a datastore in a same protection group or recovery plan, as well as scenarios where the user configures for load balancing to automatically move VM data and VMs around the datastores in a same consistency group.

Figure 7:
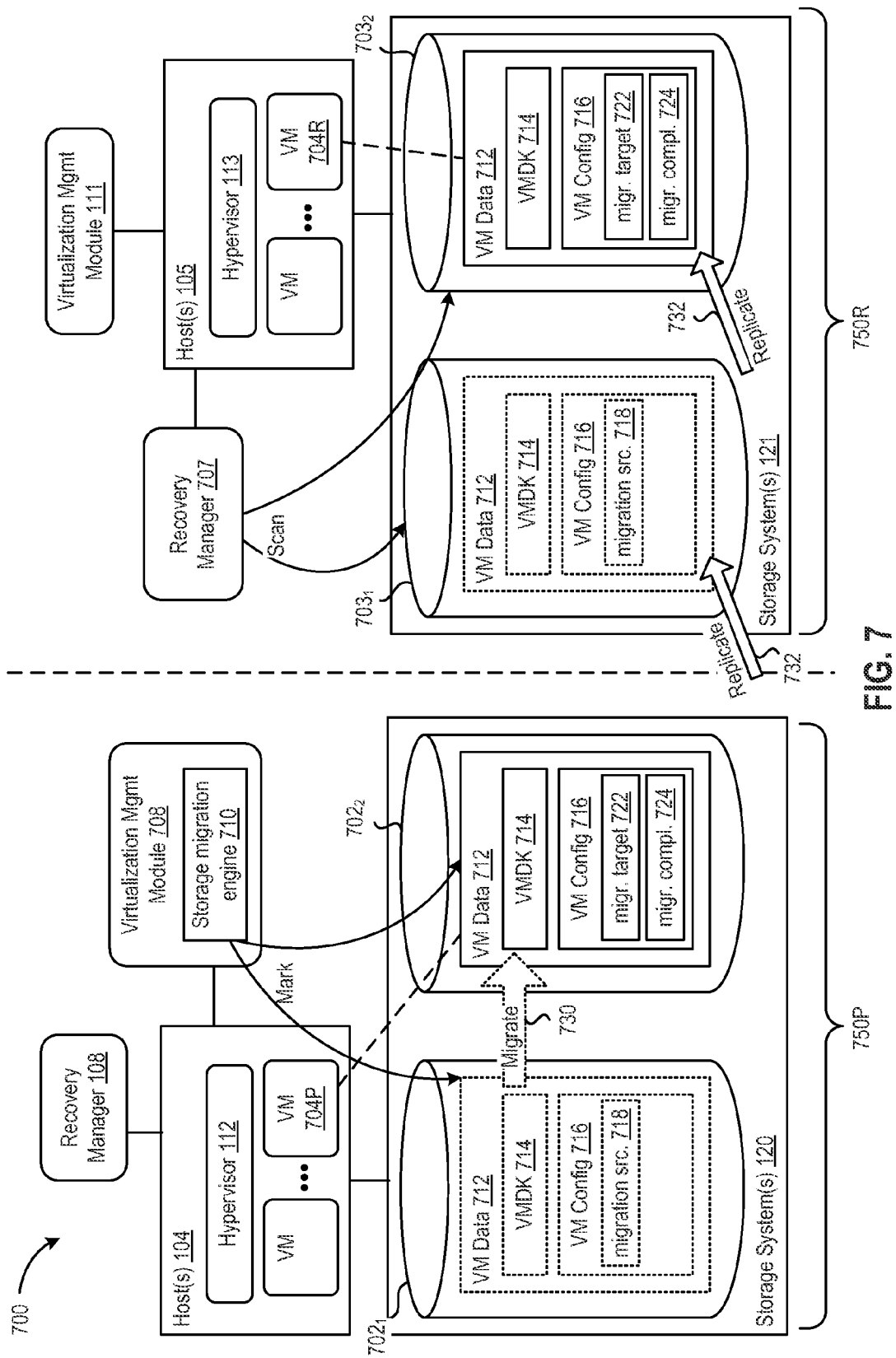
FIG. 7 is a block diagram depicting a computer system configured to perform a failover operation even in cases of a replication mismatch between the known location of the VM replica and the actual data in the replica presented by the storage array, according to one embodiment of the present disclosure.

FIG. 7 is a block diagram depicting a computer system 700 configured to perform a failover operation even in cases of a replication mismatch between the known location of the VM replica and the actual data in the replica presented by the storage array, according to one embodiment of the present disclosure. Computer system 700 includes a protected site 750P and a recovery site 750R communicatively connected by one or more networks (not shown). Protected site 750P includes a storage system 120 having a replication manager (not shown) configured to perform storage-based replication (depicted as arrows 732) with a corresponding storage system 121 at recovery site 750R. Storage system 120 includes datastores $702_1$ and $702_2$, and storage system 121 at recovery site 750R includes replica datastores $703_1$ and $703_2$.

In one or more embodiments, datastores $702_1$ and $702_2$ are formatted to store virtual machine data associated with VMs running on host 104. In the embodiment shown in FIG. 7, storage system 120 stores VM data 712 associated with VM 704P executing in host 104. VM data 712 includes one or more virtual disk files 714 (e.g., VMDK files) that store the contents of VM 704P's virtual hard disk drive. VM data 712 further includes one or more VM-related configuration files 716 that stores settings for VM 704P. VM data 712 may include other data, such as log files of the VM's activity, a paging file (e.g., ".vmem" files) which backs up VM's memory on the host file system (i.e., in cases of memory over commitment), which are not shown for clarity of illustration. VM data 712 may be organized within a datastore in a designated directory for VM 704P, or in a packaged file. It should be noted that VM data for other VMs executing on host 104 are also contained within datastores of storage system 120, and are omitted from FIG. 7 for clarity.

In one embodiment, VM configuration file 716 specifies a plurality of settings and configurations associated with an associated VM and in one implementation, are embodied by ".vmx" files. VM configuration file 716 may include virtual hardware settings, such as, disk sizes, amounts of RAM, parallel and serial port information, NIC information, advanced power and resource settings, information about a guest operating system, power management options. Each virtual machine is assigned an identifier, sometimes referred to as a universally unique identifier (UUID), which can be stored in VM configuration file 716. In one implementation, the UUID may be a 128-bit integer based on a physical computer's identifier and the path to the virtual machine's configuration file. According to one or more embodiments, VM configuration file 716 stores information related to the storage migration of the associated VM, if pertinent.

Computer system 700 includes a virtualization management module 708 having a storage migration engine 710 at protected site 750P. Storage migration engine 710 at protected site 750P is configured to perform a storage migration operation (depicted as arrow 730) that moves VM data 712 from a "source" datastore $702_1$ to a "destination" datastore $702_2$. Storage migration engine 710 is further configured to mark instances of VM data 712 during storage migration 730. These marks are stored directly on the datastore together with the VM data such that the marks are replicated by storage system 120 consistently with the VM data. Computer system 700 includes a recovery manager 707 at recovery site 750R configured to analyze these marks to choose a best candidate instance of VM data to recover each VM.

In one embodiment, storage migration engine 710 is configured to generate a mark indicating whether a given instance of VM data is a source of a migration, a mark indicating whether a given instance of VM data is a destination (i.e., target) of a migration, and a mark indicating whether a given instance of VM data has been migrated successfully, the latter of which is stored only with a target instance of VM data. In the embodiment shown, the instance of VM data 712 stored in datastore $702_1$ includes a migration source field 718 indicating that instance of VM data is a source of a migration (arrow 730). The instance of VM data 712 on datastore $702_2$ includes a migration target field 722 indicating that instance of VM data is a target of the migration, and a migration completed field 724. It should be recognized that the described marks may be stored within the datastore using a variety of implementations, for example, encoded in a single data field, or in any of multiple fields. In an alternative embodiment, marks indicating whether a given instance of VM data is a source or a destination may share a single field having a logical true or false value, respectively.

Figure 8:
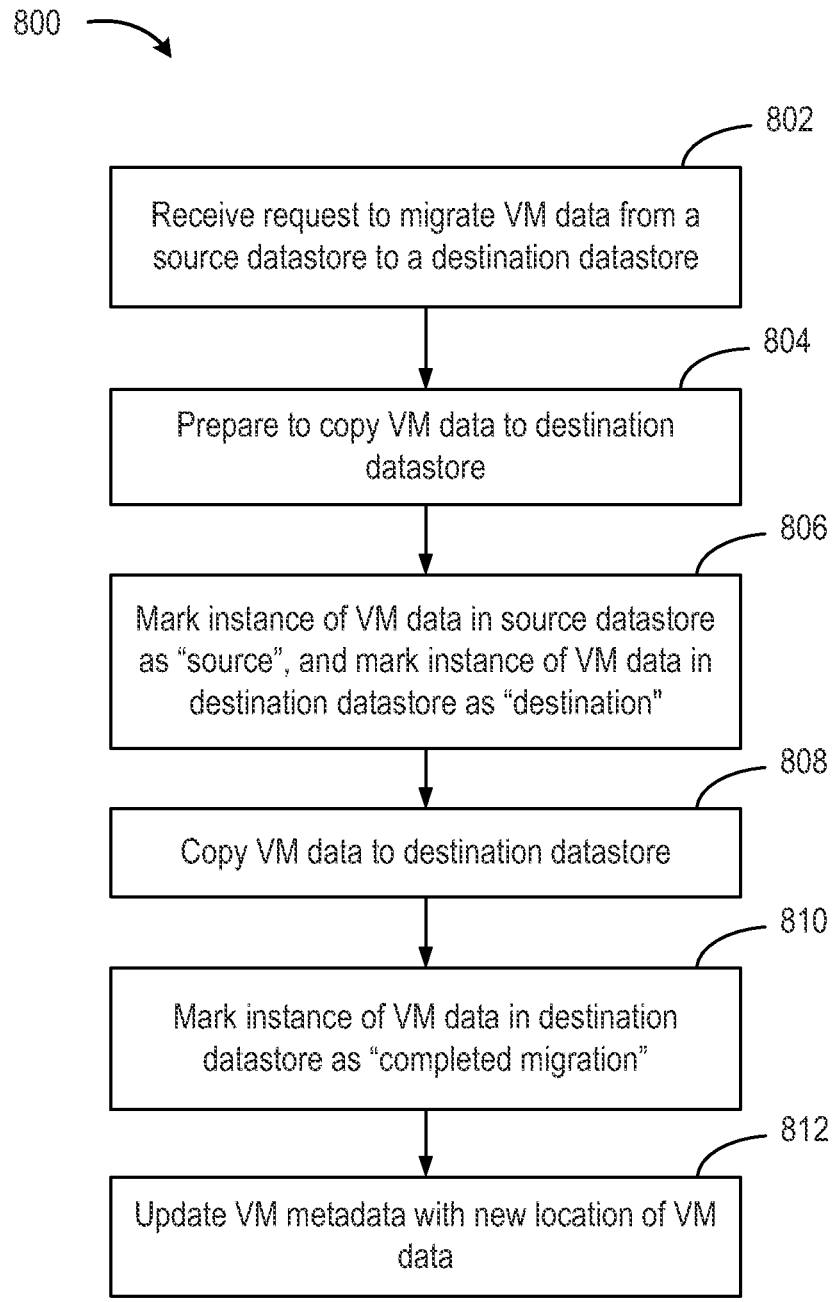
FIG. 8 is a flow diagram depicting a method for marking VM data with migration status, according to one embodiment of the present disclosure.

FIG. 8 is a flow diagram depicting a method 800 for marking VM data with migration status, according to one embodiment of the present disclosure. While method 800 is described in conjunction with components of the system shown in FIG. 7, other components in computer system 700 may perform the steps of method 800, as well as other systems may perform the described method.

Method 800 begins at step 802, where storage migration engine 710 at protected site 750P receives a request to migrate VM data 712 from a source datastore $702_1$ to a destination datastore $702_2$. The storage migration operation may be initiated manually by a user, or automatically by a load balancing component of virtualization management module 708. At step 804, storage migration engine 710 prepares to copy VM data to destination datastore $702_2$. In some embodiments, storage migration engine 710 creates files and directories at destination datastore $702_2$, including VM configuration files 716.

At step 806, storage migration engine 710 marks the instance of VM data 712 at source datastore $702_1$ indicating the instance as a source of a storage migration, and marks the newly-created instance of VM data 712 at destination datastore $702_2$ indicating the instance as a destination of a storage migration. In one embodiment, storage migration engine 710 writes a first value (e.g., logical true) to a migration source field 718 within VM configuration file 716 indicating that the instance of VM data 712 is associated with a source of a migration. Storage migration engine 710 writes a value (e.g., logical true) to a migration target field 722 within VM configuration file 716 within datastore $702_2$ indicating the instance of VM data is associated with a destination of a migration. In some embodiments, storage migration engine 710 may write a value (e.g., logical false) to a migration completed field 724 within VM configuration file 716 within datastore $702_2$ indicating that that instance of VM data 712 at datastore $702_2$ has not yet been migrated successfully.

At step 808, storage migration engine 710 copies VM data 712, including VMDK(s) 714 and other VM-related files, from source datastore $702_1$ to datastore $702_2$. At step 810, responsive to completing copying of VM data from the source datastore to the destination datastore, storage migration engine 710 marks the instance of VM data 712 in destination datastore $702_2$ with an indication that the given VM data has been migrated successfully. For example, storage migration engine 710 changes the value (e.g., to a logical true) of migration completed field 724 within VM configuration file 716 to indicate that that instance of VM data 712 at datastore $702_2$ has now been successfully and completely migrated. In some embodiments, storage migration engine 710 marks the source instance as migration completed as well, i.e., changes the value of a migration completed field (not shown) of the instance of VM data at the source datastore $702_1$.

At step 812, storage migration engine 710 updates VM metadata with the new location of VM data 712 (i.e., at datastore $702_2$) and deletes the old instance of VM data at source datastore $702_1$. In some embodiments, storage migration engine 710 may update the inventory service of virtualization management module 708 to specify the new storage location of files associated with VM 704P within datastore $702_2$.

Figure 9:
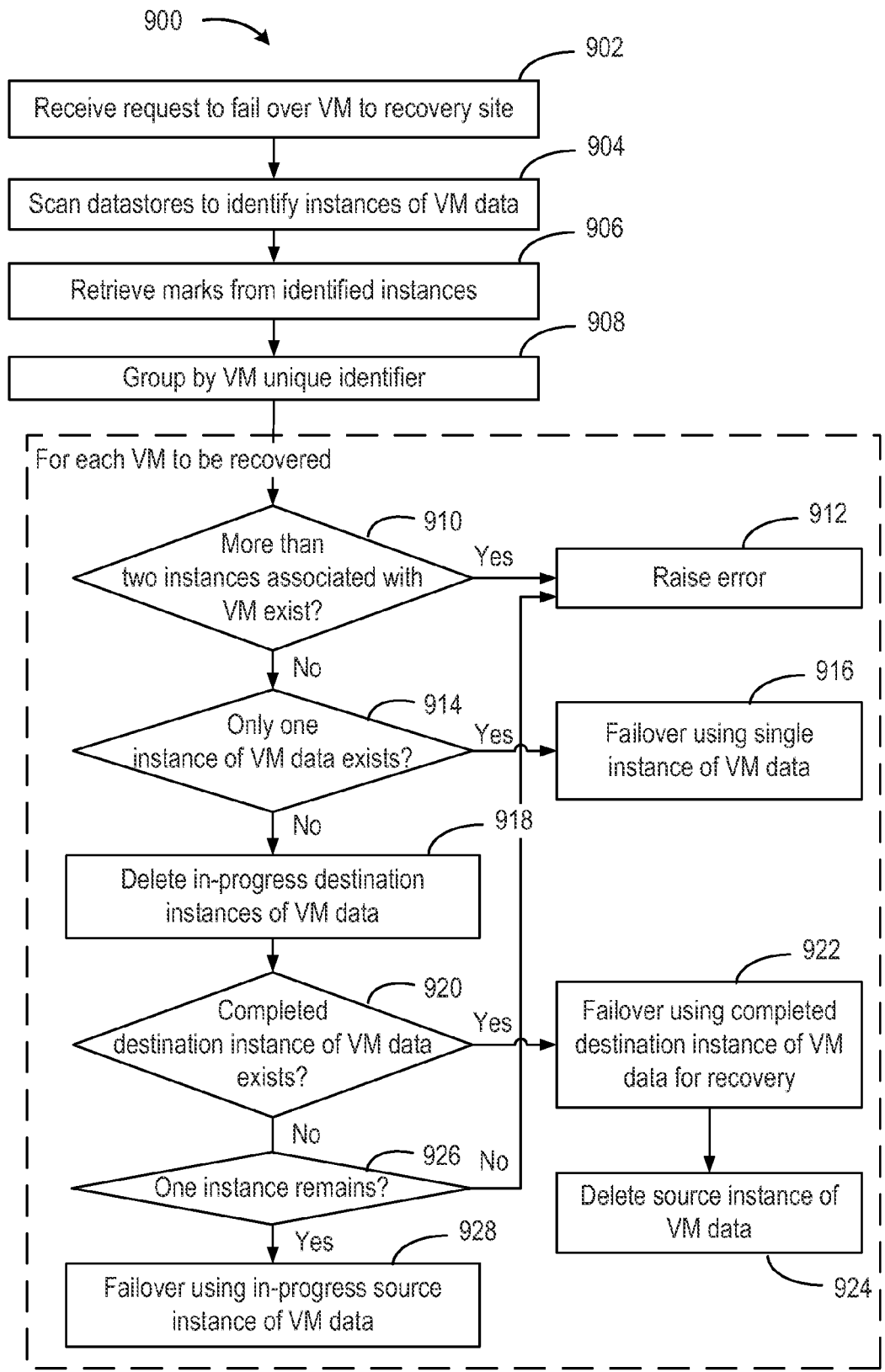
FIG. 9 is a flow diagram depicting a method for performing a failover at a recovery site, according to one embodiment of the present disclosure.

FIG. 9 is a flow diagram depicting a method 900 for performing a failover at a recovery site, according to one embodiment of the present disclosure. While method 900 is described in conjunction with components of the system shown in FIG. 7, other components in computer system 700 may perform the steps of method 900, as well as other systems may perform the described method.

At step 902 of method 900, recovery manager 707 at recovery site 750R receives a request to fail over VM 704P to the replica (i.e., VM 704R) at recovery site 750R. The failover operation may be initiated manually by a user as a planned or test failover, or automatically as part of a planned or unplanned failover. The failover operation may specify one or more virtual machines to be recovered, including particular virtual machine(s), virtual machines on particular datastores, and virtual machines in a particular protection group.

At step 904, recovery manager 707 at the recovery site scans all recovered datastores to locate and identify all instances of VM data stored on the datastores. In one embodiment, recovery manager 707 searches datastores 703 at recovery site 750R for all VM configuration files 716 (e.g., all *.vmx files) corresponding to instances of VM data 712. In some embodiments, recovery manager 707 interacts with datastores 703 via a "datastore browser" functionality provided by virtualization management module 111, which enables recovery manager 707 to delete files from a datastore, search files of a datastore, or move files between datastores. In other embodiments, recovery manager 707 interacts directly with datastores 703 via a storage interface of storage system 121.

Depending on the timing of the failover operation relative to any storage migrations between datastores that may have occurred at protected site 750P, and to replication of such changes to recovery site 750R, a mismatch of VM data may exist in datastores 703 at recovery site 750R. For example, a replica VM at recovery site 750R may have more than one instance of VM data, i.e., one instance of VM data 712 on datastore 703$_1$ and another instance on datastore 703$_2$, in cases of storage replication of an in-progress storage migration at protected site 750P. In cases where a failover operation initiates after a storage migration at protected site 750P but before storage replication, an instance of VM data for replica VM 704R might be stored on one datastore 703$_1$ even though an early replication of metadata at recovery site 750R might indicate the VM's data should be on datastore 703$_2$. As such, recovery manager 707 uses metadata stored directly within datastores 703 to recover VM 704R.

At step 906, recovery manager 707 retrieves one or more marks from the identified instances of VM data 712 in datastores 703. In one embodiment, recovery manager 707 retrieves, from each identified instance, an indication of whether the given instance of VM data is a source of a storage migration, an indication of whether the given instance of VM data is a target of a storage migration, and an indication of whether the given instance is a target instance that has been migrated successfully. In the example of FIG. 7, recovery manager 707 retrieves the values of migration source field 718 from VM configuration file 716 of the first instance of VM data 712 discovered in datastore 703$_1$, and the values of migration target field 722 and migration completed field 724 from VM configuration file 716 of the second instance of VM data 712 discovered in datastore 703$_2$.

At step 908, recovery manager 707 groups the identified instances of VM data 712 according to their associated virtual machine. In one embodiment, recovery manager 707 retrieves an identifier (e.g., UUID) from each instance of VM data (e.g., contained in VM configuration file 716) specifying the virtual machine associated with the instance. Recovery manager 707 groups each instance of VM data according to the VM identifier (e.g., UUID) contained in the instance. The VM identifier may be used to filter for those VM data to be used for recovery. For each VM to be recovered and having a given UUID, recovery manager 707 performs the operations as follows.

At step 910, recovery manager 707 determines whether the VM to be recovered has more than two instances of VM data having the associated identifier (i.e., UUID). If so, at step 912, recovery manager 707 raises an error and does not recover the VM, as there is no clear candidate VM data instance. Similarly, in some embodiments, recovery manager 707 may raise an error if no instances of VM data are found having the identifier associated with the VM to be recovered. Recovery manager 707 may proceed to a next VM to be recovered and perform the operations described below.

At step 914, recovery manager 707 determines whether only a single instance of VM data exists for a particular VM to be recovered based on the associated identifier. If so, at step 916, recovery manager 707 performs the requested failover operation using that single instance of VM data. This operation covers the normal scenario for failover, in which no problems involving storage migration and replication have arisen. This operation also enables for failover even in cases where the instance of VM data exists at a different location than previously known by recovery manager 707, i.e., a scenario of replication mismatch between storage replication and metadata replication described earlier. As such, recovery manager 707 performs the requested failover using that single instance of VM data, which may mean disregarding location metadata that has been replicated to recovery manager 707 for that VM and might indicate a different location than ultimately used (e.g., VM metadata 610A in FIG. 6C).

At step 918, recovery manager 707 deletes in-progress destination instance(s) of VM data, i.e., instances of VM data from incomplete migrations. In one implementation, recovery manager 707 deletes any instances of VM data having migration target field 722 indicating the instance is a storage migration destination and migration completed field 724 (e.g., false) indicating the migration has not been completed successfully. In alternative embodiments, rather than delete the file(s), as referred to herein, recovery manager 707 only marks the incomplete destination instances of VM data for deletion, and omits the instance from further consideration for recovery. In another embodiment, recovery manager 707 merely ignores such incomplete destination instances of VM data, and leaves the instances as is without deleting.

At step 920, recovery manager 707 determines whether a completed destination instance of VM data exists. If so, at step 922, recovery manager 707 performs the requested failover operation to a VM 704R at recovery site 750R using the completed destination instance of VM data 712. This operation enables failover in the scenario in which a storage migration was completed at protected site 750P, however only the destination datastore 702$_2$ had been replicated to recovery site 750R. As a result, both datastore 703$_1$ and datastore 703$_2$ contain instances of VM data. This case may arise when the involved datastores 702$_1$ and 702$_2$ are in the same protection group but not in the same consistency group, and replication mismatches between source and destination datastore occur.

In one embodiment, at step 924, recovery manager 707 deletes any completed source instance of VM data from the underlying datastores, if exists. For example, responsive to determining the instance of VM data on datastore 703$_2$ has a migration target field 722 indicating the instance is a target migration destination and migration completed field 724 (e.g., true) indicating the migration has been completed, recovery manager 707 deletes the corresponding source instance of VM data stored on datastore 703$_1$ having a migration source field 718 indicating the instance is a source instance (of a successfully completed migration). In some embodiments, recovery manager 707 deletes the source instance of VM data stored on datastore 703$_1$ having a migration source field 718 as well as a migration completed field (not shown) indicating the instance is a source of a successfully completed migration (i.e., true, true).

At step 926, responsive to determining that a complete destination instance of VM data does not exist, recovery manager 707 checks whether there is now exactly one instance of VM data remaining, i.e., an in-progress source instance of VM data. If so, at step 928, recovery manager 707 performs the requested failover operation using the in-progress source instance of VM data. That is, recovery manager 707 performs failover on a VM 704R using the instance of VM data 712 having a migration source field 718 indicating (i.e., true) that the instance is a storage migration source, and in some embodiments a migration completed field indicating (i.e., false) that the storage migration has not yet been completed successfully. This operation enables an unplanned failover to recovery site 750R when replication had occurred in the middle of a VM storage migration. Responsive to determining that there is not exactly one instance of VM remaining (i.e., none or two remaining instances), recovery manager 707 proceeds to step 912, raising an error, and does not recover the VM.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or acts do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for performing failover of a virtual machine, the method comprising:
   performing a storage migration of virtual machine data associated with a virtual machine (VM) in a first storage system, wherein indications of the storage migration are stored directly in the first storage system with the VM data;
   receiving a request to fail over the VM from a protected site comprising the first storage system to a recovery site, wherein the first storage system is configured to perform array-based replication of the VM data including the indications of storage migration with a corresponding second storage system at the recovery site;
   identifying one or more instances of VM data associated with the VM stored in the second storage system at the recovery site;
   responsive to determining the one or more instances of VM data comprises a destination instance of a successfully completed storage migration based on indications stored within each of the one or more instances of VM data in the second storage system, selecting the destination instance for recovery; and
   performing failover of the VM at the recovery site using the selected instance of VM data.

2. The method of claim 1, wherein identifying the one or more instances of VM data associated with the VM stored in the second storage system further comprises:
   scanning a plurality of datastores stored in the second storage system for instances of VM data;
   grouping the identified instances of VM data by a virtual machine identifier contained within each instance of VM data and stored in the second storage system; and
   selecting a group of instances of VM data having the virtual machine identifier associated with the VM.

3. The method of claim 1, further comprising:
   responsive to determining the one or more instances of VM data comprises a single instance of VM data associated with the VM stored in the second storage system at the recovery site, selecting the single instance of VM data and disregard location metadata at the recovery site indicating a different instance of VM data.

4. The method of claim 1, wherein the indications of the storage migration comprise a first mark, a second mark, and a third mark, and are stored directly in the first storage system with the VM data by performing a process comprising:

prior to performing the storage migration, writing the first mark to a first instance of VM data indicating a source instance and writing a second mark to a second instance of VM data indicating a destination instance;

responsive to completing the storage migration, writing the third mark to the second instance of VM data indicating the storage migration has been successfully completed.

5. The method of claim 1, further comprising:

deleting one of the instances of VM data stored in the second storage system comprising a source instance of VM data of the successfully completed storage migration.

6. The method of claim 1, further comprising:

deleting one of the instances of VM data stored in the second storage system comprising a destination instance of VM data of an incomplete storage migration.

7. The method of claim 1, further comprising:

responsive to determining the one or more instances of VM data does not comprise a destination instance of a successfully completed storage migration, selecting for recovery one of the instances of VM data comprising a source instance of VM data of an incomplete storage migration.

8. A non-transitory computer readable storage medium having stored thereon computer software executable by a processor, the computer software embodying a method for performing failover of a virtual machine, the method comprising:

performing a storage migration of virtual machine data associated with a virtual machine (VM) in a first storage system, wherein indications of the storage migration are stored directly in the first storage system with the VM data;

receiving a request to fail over the VM from a protected site comprising the first storage system to a recovery site, wherein the first storage system is configured to perform array-based replication of the VM data including the indications of storage migration with a corresponding second storage system at the recovery site;

identifying one or more instances of VM data associated with the VM stored in the second storage system at the recovery site;

responsive to determining the one or more instances of VM data comprises a destination instance of a successfully completed storage migration based on indications stored within each of the one or more instances of VM data in the second storage system, selecting the destination instance for recovery; and performing failover of the VM at the recovery site using the selected instance of VM data.

9. The non-transitory computer readable storage medium of claim 8, wherein identifying the one or more instances of VM data associated with the VM stored in the second storage system further comprises:

scanning a plurality of datastores stored in the second storage system for instances of VM data;

grouping the identified instances of VM data by a virtual machine identifier contained within each instance of VM data and stored in the second storage system; and selecting a group of instances of VM data having the virtual machine identifier associated with the VM.

10. The non-transitory computer readable storage medium of claim 8, wherein the method further comprises:

responsive to determining the one or more instances of VM data comprises a single instance of VM data associated with the VM stored in the second storage system at the recovery site, selecting the single instance of VM data and disregard location metadata at the recovery site indicating a different instance of VM data.

11. The non-transitory computer readable storage medium of claim 8, wherein the indications of the storage migration comprise a first mark, a second mark, and a third mark, and are stored directly in the first storage system with the VM data by performing a process comprising:

prior to performing the storage migration, writing the first mark to a first instance of VM data indicating a source instance and writing a second mark to a second instance of VM data indicating a destination instance;

responsive to completing the storage migration, writing the third mark to the second instance of VM data indicating the storage migration has been successfully completed.

12. The non-transitory computer readable storage medium of claim 8, wherein the method further comprises:

deleting one of the instances of VM data stored in the second storage system comprising a source instance of VM data of the successfully completed storage migration.

13. The non-transitory computer readable storage medium of claim 8, wherein the method further comprises:

deleting one of the instances of VM data stored in the second storage system comprising a destination instance of VM data of an incomplete storage migration.

14. The non-transitory computer readable storage medium of claim 8, wherein the method further comprises:

responsive to determining the one or more instances of VM data does not comprise a destination instance of a successfully completed storage migration, selecting for recovery one of the instances of VM data comprising a source instance of VM data of an incomplete storage migration.

15. A computer system for performing failover of a virtual machine, the computer system comprising:

a protected site comprising a first storage system and a first processor programmed to carry out the steps of: performing a storage migration of virtual machine data associated with a virtual machine (VM) in the first storage system, wherein indications of the storage migration are stored directly in the first storage system with the VM data;

a recovery site comprising a second storage system and a second processor programmed to carry out the steps of:

receiving a request to fail over the VM from the protected site to the recovery site, wherein the first storage system is configured to perform array-based replication of the VM data including the indications of storage migration with the corresponding second storage system at the recovery site;

identifying one or more instances of VM data associated with the VM stored in the second storage system at the recovery site;

responsive to determining the one or more instances of VM data comprises a destination instance of a successfully completed storage migration based on indications stored within each of the one or more instances of VM data in the second storage system, selecting the destination instance for recovery; and performing failover of the VM at the recovery site using the selected instance of VM data.

16. The computer system of claim 15, wherein the second processor programmed to carry out the steps of identifying the one or more instances of VM data associated with the VM stored in the second storage system is further programmed to carry out the steps of:

scanning a plurality of datastores stored in the second storage system for instances of VM data;

grouping the identified instances of VM data by a virtual machine identifier contained within each instance of VM data and stored in the second storage system; and selecting a group of instances of VM data having the virtual machine identifier associated with the VM.

17. The computer system of claim 15, wherein the second processor is further programmed to carry out the steps of:

responsive to determining the one or more instances of VM data comprises a single instance of VM data associated with the VM stored in the second storage system at the recovery site, selecting the single instance of VM data and disregard location metadata at the recovery site indicating a different instance of VM data.

18. The computer system of claim 15, wherein the indications of the storage migration comprise a first mark, a second mark, and a third mark, and are stored directly in the first storage system with the VM data by performing a process comprising:

prior to performing the storage migration, writing the first mark to a first instance of VM data indicating a source instance and writing a second mark to a second instance of VM data indicating a destination instance;

responsive to completing the storage migration, writing the third mark to the second instance of VM data indicating the storage migration has been successfully completed.

19. The computer system of claim 15, wherein the second processor is further programmed to carry out the steps of:

deleting one of the instances of VM data stored in the second storage system comprising a source instance of VM data of the successfully completed storage migration; and deleting one of the instances of VM data stored in the second storage system comprising a destination instance of VM data of an incomplete storage migration.

20. The computer system of claim 15, wherein the second processor is further programmed to carry out the steps of:

responsive to determining the one or more instances of VM data does not comprise a destination instance of a successfully completed storage migration, selecting for recovery one of the instances of VM data comprising a source instance of VM data of an incomplete storage migration.

* * * * *